(12) United States Patent
Knebl et al.

(10) Patent No.: US 9,439,081 B1
(45) Date of Patent: Sep. 6, 2016

(54) SYSTEMS AND METHODS FOR NETWORK PERFORMANCE FORECASTING

(71) Applicant: Further LLC, Media, PA (US)

(72) Inventors: Matthew Brian Knebl, Aliso Viejo, CA (US); Amr Albanna, Irvine, CA (US)

(73) Assignee: Further LLC, Media, PA (US)

( * ) Notice: Subject to any disclaimer, the term of this patent is extended or adjusted under 35 U.S.C. 154(b) by 243 days.

(21) Appl. No.: 14/172,686

(22) Filed: Feb. 4, 2014

Related U.S. Application Data

(60) Provisional application No. 61/849,748, filed on Feb. 4, 2013.

(51) Int. Cl.
*H04W 16/18* (2009.01)
*G06N 99/00* (2010.01)

(52) U.S. Cl.
CPC .......... *H04W 16/18* (2013.01); *G06N 99/005* (2013.01)

(58) Field of Classification Search
CPC ........................... H04W 16/18; G06N 99/005
USPC ........................................................... 706/11
See application file for complete search history.

(56) References Cited

U.S. PATENT DOCUMENTS

| | | | |
|---|---|---|---|
| 6,754,487 B1 | 6/2004 | Sanders et al. | |
| 6,996,374 B1* | 2/2006 | Bao | H04W 24/02 455/423 |
| 8,538,787 B2 | 9/2013 | Braun et al. | |
| 2007/0192065 A1* | 8/2007 | Riggs | G06Q 10/04 702/189 |
| 2008/0109731 A1* | 5/2008 | Chang | H04L 12/2602 715/736 |
| 2008/0144905 A1* | 6/2008 | Tallman | G06F 3/04847 382/131 |
| 2011/0149782 A1* | 6/2011 | Townley | H04L 41/147 370/252 |
| 2012/0303413 A1* | 11/2012 | Wang | G06Q 10/0631 705/7.31 |
| 2013/0143561 A1* | 6/2013 | Nuss | H04W 24/02 455/436 |
| 2013/0281089 A1 | 10/2013 | Chandrasekhar et al. | |
| 2013/0281100 A1 | 10/2013 | Lanzo et al. | |
| 2013/0291034 A1* | 10/2013 | Basile | H04N 17/004 725/107 |

(Continued)

FOREIGN PATENT DOCUMENTS

| | | |
|---|---|---|
| EP | 2372937 | 10/2011 |
| EP | 2557830 | 2/2013 |

(Continued)

OTHER PUBLICATIONS

Eduardo Yusta Padilla et al., "Method and system for predicting the channel usage", EP 2 750 432 A1, Date of filing: Dec. 28, 2012, Date of publication: Jul. 2, 2014. (pertinent date prohibits use as art).*

*Primary Examiner* — Stanley K Hill
*Assistant Examiner* — Dave Misir
(74) *Attorney, Agent, or Firm* — Knobbe, Martens, Olson & Bear, LLP

(57) ABSTRACT

Untapped capacity and opportunities for immediate performance improvement can be brought to light in wireless networks through the use of new predictive analytics tools and processes. By knowing the specific breaking points in the network well in advance, network adjustments can be planned and implemented in time to preserve a good customer experience. To successfully manage rapidly rising traffic, network operators can adopt a performance-based approach to capacity planning and optimization. Predictive analytics tools and processes may allow a user to view current network conditions for one or more cells in a network. The tools and processes may also allow the user to view predicted network conditions on a chosen future date for one or more cells in the network.

21 Claims, 11 Drawing Sheets

(56) References Cited

U.S. PATENT DOCUMENTS

| | | |
|---|---|---|
| 2013/0331109 A1 | 12/2013 | Dhillon et al. |
| 2014/0111517 A1* | 4/2014 | Vela ................. H04W 4/24 345/440 |
| 2014/0113600 A1* | 4/2014 | El Gamal ............ H04W 28/16 455/414.3 |
| 2014/0205207 A1* | 7/2014 | Bhatt .................. G06T 5/00 382/311 |

FOREIGN PATENT DOCUMENTS

| | | |
|---|---|---|
| WO | WO 2006/060358 | 6/2006 |
| WO | WO 2008/107020 | 9/2008 |
| WO | WO 2008/121062 | 10/2008 |
| WO | WO 2008/131473 | 11/2008 |
| WO | WO 2009/004661 | 1/2009 |
| WO | WO 2013/026469 | 2/2013 |
| WO | WO 2013/144950 | 10/2013 |

\* cited by examiner

| Cell A | Voice Access Success Rate | Voice Dropped Call Rate (1-x) | Data Access Success Rate | Data Dropped Call Rate (1-x) | UL RSSI |
|---|---|---|---|---|---|
| Voice Access Success Rate | 1 | | | | |
| Voice Dropped Call Rate (1-x) | 0.797618008 | 1 | | | |
| Data Access Success Rate | 0.747748544 | 0.446822958 | 1 | | |
| Data Dropped Call Rate (1-x) | 0.706771662 | 0.748132605 | 0.295296722 | 1 | |
| UL RSSI | -0.712058705 | -0.697786835 | -0.23484463 | -0.713756863 | 1 |
| Voice Traffic | 0.084119375 | -0.108019685 | 0.143993875 | -0.314245134 | -0.17406 |
| Data Traffic | -0.609588102 | -0.427922 | -0.373411583 | -0.376267086 | 0.760298 |
| Pilot Power | 0.34167791 | 0.033455522 | 0.222548757 | -0.023706299 | -0.46867 |
| Load Threshold | 0.37215507 | 0.148701086 | 0.37382027 | -0.064013541 | -0.35361 |
| Offset | -0.260524872 | -0.020064835 | -0.279506023 | -0.105153629 | 0.230139 |

| Cell A | Voice Traffic | Data Traffic | Pilot Power | Load Threshold | Offset |
|---|---|---|---|---|---|
| Voice Access Success Rate | | | | | |
| Voice Dropped Call Rate (1-x) | | | | | |
| Data Access Success Rate | | | | | |
| Data Dropped Call Rate (1-x) | | | | | |
| UL RSSI | | | | | |
| Voice Traffic | 1 | | | | |
| Data Traffic | -0.3014932171 | 1 | | | |
| Pilot Power | 0.855278736 | -0.644290251 | 1 | | |
| Load Threshold | 0.842359732 | -0.628829328 | 0.854530343 | 1 | |
| Offset | -0.309552223 | 0.382324117 | -0.458682472 | -0.476102729 | 1 |

FIG. 3

SUMMARY OUTPUT

| Regression Statistics | |
|---|---|
| Multiple R | 0.919755067 |
| R Square | 0.845949384 |
| Adjusted R Square | 0.761921775 |
| Standard Error | 4.377611993 |
| Observations | 18 |

ANOVA

| | df | SS | MS | F | Significance F |
|---|---|---|---|---|---|
| Regression | 6 | 1157.572378 | 192.9287 | 10.0675171 | 0.000628085 |
| Residual | 11 | 210.7983544 | 19.16349 | | |
| Total | 17 | 1368.370733 | | | |

| | Coefficients | Standard Error | t Stat | P-value | Lower 95% | Upper 95% | Lower 95.0% | Upper 95.0% |
|---|---|---|---|---|---|---|---|---|
| Intercept | 370.5668389 | 82.33825472 | 4.500543 | 0.0009004 | 189.3415622 | 551.7921155 | 189.3415622 | 551.7921155 |
| Total Traffic | -4.690950068 | 1.858869365 | -2.52355 | 0.02829626 | -8.782293953 | -0.599606183 | -8.782293953 | -0.599606183 |
| UL RSSI | 1.301611183 | 0.790743924 | 1.646059 | 0.12799461 | -0.438804457 | 3.042026824 | -0.438804457 | 3.042026824 |
| INT Traff UL RSSI | -0.051910063 | 0.02020234 | -2.56951 | 0.02607326 | -0.096375113 | -0.007445013 | -0.096375113 | -0.007445013 |
| Power | -0.541847342 | 0.33291874 | -1.62757 | 0.13189486 | -1.274596548 | 0.190901863 | -1.274596548 | 0.190901863 |
| Load Threshold | 0.298584904 | 0.144852677 | 2.061301 | 0.0637223 | -0.020233689 | 0.617403497 | -0.020233689 | 0.617403497 |
| Offset | 1.360961345 | 1.722636713 | 0.790045 | 0.44619858 | -2.430536496 | 5.152459185 | -2.430536496 | 5.152459185 |

FIG. 5

SYSTEMS AND METHODS FOR NETWORK PERFORMANCE FORECASTING

CROSS-REFERENCE TO RELATED APPLICATIONS

This application claims priority to U.S. Provisional Patent Application No. 61/849,748, entitled "NETWORK PERFORMANCE FORECASTING" and filed on Feb. 4, 2013, the entire contents of which disclosure is hereby incorporated by reference.

BACKGROUND

A cellular network or mobile network can include a wireless network distributed over land areas called cells, each served by at least one fixed-location transceiver known as a cell site or base station. In a cellular network, each cell uses a different set of frequencies or codes from neighboring cells to avoid interference and provide acceptable performance within each cell. When joined together, these cells provide radio coverage over a wide geographic area. This joining of cells enables a large number of portable transceivers (e.g., mobile phones, pagers, etc.) to communicate with each other and with transceivers and telephones anywhere in the network, via base stations, even if some of the transceivers are moving through more than one cell during transmission.

Major telecommunications providers have deployed voice and data cellular networks over most of the inhabited land area of the Earth. This wide deployment allows mobile phones and mobile computing devices to be connected to the public switched telephone network and public Internet. Private cellular networks can be used for research or for large organizations and fleets, such as dispatch for local public safety agencies.

SUMMARY

One aspect of the disclosure provides a computer-implemented method of forecasting wireless network performance. The method comprises receiving historical performance data and baseline data for a cell in a network. The historical performance data may comprise a plurality of key performance indicators (KPIs). The method further comprises receiving, from a user, a selection of a first KPI in the plurality of KPIs. The method further comprises applying a machine learning model to the first KPI and at least one KPI in the plurality of KPIs. The method further comprises generating at least one model parameter based on application of the machine learning model. The method further comprises applying the baseline data to the at least one model parameter. The method further comprises calculating a predicted value of the first KPI for the cell in the network based on the application of the baseline data to the at least one model parameter. At least said calculating may be performed by a computer system comprising computer hardware.

Another aspect of the disclosure provides a system comprising a computer data repository that stores historical performance data for a cell in a network. The system further comprises a computing system comprising one or more computing devices, the computing system in communication with the computer data repository. The computing system may be programmed to implement a historical performance data collection unit configured to receive the historical performance data, the historical performance data comprising a plurality of key performance indicators (KPIs). The computing system may be further programmed to implement a network forecast determination unit configured to receive a selection of a first KPI in the plurality of KPIs. The network forecast determination unit may be further configured to apply a machine learning model to at least the first KPI to produce a model parameter and calculate a predicted value of the first KPI for the cell in the network based on the model parameter.

Another aspect of the disclosure provides a computer storage system comprising a non-transitory storage device, said computer storage system having stored thereon executable program instructions that direct a computer system to at least access historical performance data associated with a telecommunications network, the historical performance data comprising a plurality of key performance indicators (KPIs). The computer storage system further has stored thereon executable program instructions that direct a computer system to at least electronically output a graphical user interface for presentation to a user, the graphical user interface comprising functionality for the user to select one or more of the KPIs. The computer storage system further has stored thereon executable program instructions that direct a computer system to at least receive, from the graphical user interface, a user selection of a first KPI of the plurality of KPIs. The computer storage system further has stored thereon executable program instructions that direct a computer system to at least identify a numerical relationship between the first KPI and one or more other KPIs in the plurality of KPIs. The computer storage system further has stored thereon executable program instructions that direct a computer system to at least calculate a predicted value of one or more of the plurality of KPIs based on the numerical relationship. The computer storage system further has stored thereon executable program instructions that direct a computer system to at least output a representation of the predicted value of the one or more of the plurality of KPIs for presentation to the user.

Certain aspects, advantages and novel features are described herein. It is to be understood that not necessarily all such advantages may be achieved in accordance with any particular embodiment disclosed herein. Thus, the features disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

Throughout the drawings, reference numbers can be re-used to indicate correspondence between referenced elements. The drawings are provided to illustrate embodiments described herein and not to limit the scope thereof.

FIG. 3 illustrates an example set of statistical correlation analysis results in a chart.

FIG. 5 illustrates an example matrix generated by the network forecast determination unit.

DETAILED DESCRIPTION

Introduction

Figure 1:
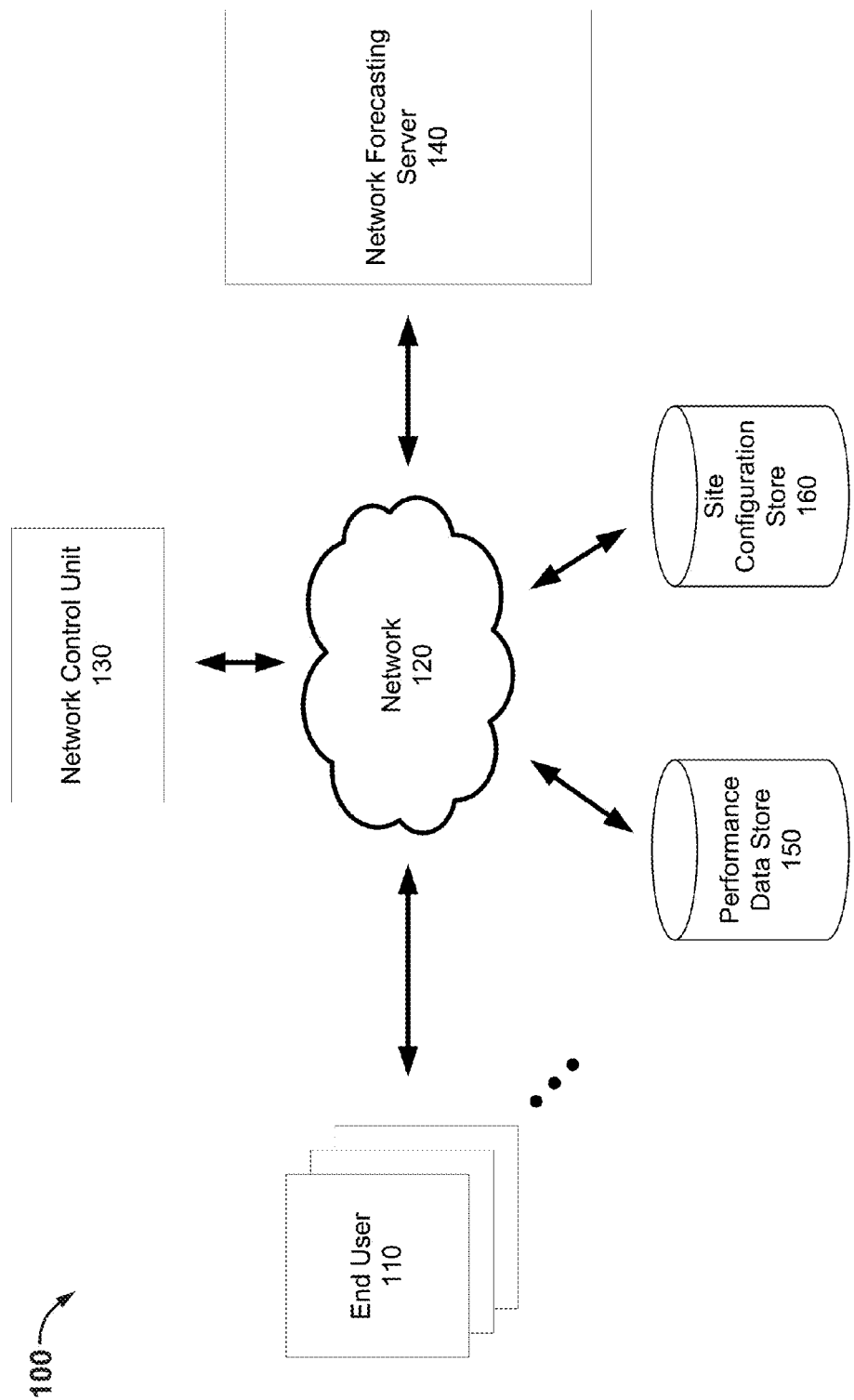
FIG. 1 illustrates a block diagram of an example network forecasting system.

Approximately $100 billion is spent worldwide each year to keep pace with rising traffic on telecommunications networks. However, much of this spending is misspent on new cell sites, spectrum addition, spectrum migration, and/or network equipment that is added too early, too late, or in the wrong place. Telecommunications networks are still being planned and optimized in large part using legacy planning tools and methods, and also gut feel and intuition. Legacy tools for capacity planning often treat all base stations as having equal capacity and/or use simple, fixed thresholds to determine when capacity needs to be added (e.g., if traffic is forecasted to exceed X erlangs or Y megabytes, then a carrier is added). For older technologies (e.g., 2G wireless telephone technology like TDMA, GSM, EDGE, etc.), this approach was sufficient. With newer network technologies (e.g., wireless telephone technologies like CDMA2000, EVDO, UMTS, HSPA+, LTE, WiMAX, etc.), though, cell capacity and performance can vary dramatically from cell to cell depending on various factors. For example, such factors may include the location of users (e.g., near, far, in buildings, etc.), traffic level and mix (e.g., voice, data, etc.), location of neighboring cells, noise from own cells and/or users, noise from neighboring cells and/or users, external interferers, and/or other factors.

Existing third party tools (e.g., propagation prediction and Automatic Cell Planning tools) can predict a crude, generic quality metric over an expected coverage area in a cellular network. However, the tools give no clear correlation between the quality metrics and the key performance indicators (KPIs) measured by network operators and experienced directly by every customer. For example, KPIs may include a dropped call rate, an access failure rate, throughput, latency, and/or the like. The accuracy of typical coverage and quality predictions is degraded by the lack of precise information about the location of users, vegetation in the coverage area, building materials used in the coverage area, and/or the like.

Attempts to overcome this problem by randomly distributing users through simulations (e.g., Monte Carlo simulations) and categorizing areas into discrete morphology types improves accuracy. However, such techniques may not accurately predict performance as experienced by customers. Operators also typically have little visibility into other real-world capacity reducers, such as imbalanced carriers, cells, and/or areas. If this data is available, it is often in table form and a great amount of effort is needed to understand, for example, whether an overloaded site is situated next to an underutilized site. Thus, tools that fill this gap between theoretical predictions and the actual customer experience may be beneficial.

Until recently there has been no accurate way to capture each telecommunication network cell's unique relation between traffic and performance, or to know the level of traffic at which a particular cell's performance will begin to degrade. However, through data mining and smart manipulation of historical performance and network configuration data, each and every carrier on the network can be characterized in terms of its relation between traffic and network performance. For example, a network operator can step any number of months into the future (e.g., 6 months, 7 months, 8 months, 9 months, etc.) and view the predicted network performance at future traffic levels. Then, network changes can be made (manually or automatically) before the customer notices any degradation due to increased traffic (e.g., a proactive approach, rather than the existing reactive approach, to maintaining good network performance). Network operators can now receive advanced notice on what needs to be addressed today or in the future to maintain or improve network performance, even while traffic is rising.

Once each cell's unique breaking point is known, network operators can identify simple, low cost ways to squeeze more capacity from existing network equipment. For example, network operators often highlight large numbers of planned new cell site builds, radio adds, and/or spectrum adds that can be cancelled or deferred. Conversely, areas that will degrade in the near future that have no relief planned can be identified and such degradation issues can be mitigated before customers experience service problems. Spectrum carving and device mix scenarios can be simulated in order to optimize timing of network adjustments and rollouts of new technologies. Networks often have excess capacity with overloaded cells located next to underutilized cells that can be proactively rebalanced through simple, low cost network changes, such as antenna azimuth, downtilt changes, and/or power changes. By analyzing the forecasted network performance, operators can prioritize which new capacity sites to build (which can take 2 or more years), which sites get additional carriers (which can take 6 months or more), the location and quantity of small cells needed, and/or the spectrum required, and plan ahead to get these modifications done on time before KPIs are impacted.

Untapped capacity and opportunities for immediate performance improvement can be brought to light in wireless networks (including cellular networks and other wireless networks) through the use of new predictive analytics tools and processes. By knowing the specific breaking points in the network well in advance, network adjustments can be planned and implemented in time to preserve a good customer experience. To successfully manage rapidly rising traffic, network operators can adopt a performance-based approach to capacity planning and optimization.

The network forecasting tools described herein may be available via a network. For example, a user (e.g., an individual, an employee of a network operator, etc.) may access the network forecasting tools via a computing device that has access to a local area network (LAN), a wide area network (WAN), the Internet, combinations of the same, or the like. The network forecasting tools, hosted by a server or such like device, may allow the user to view current network traffic conditions for one or more cells in a network. The network forecasting tools may also allow the user to view predicted network traffic conditions on a chosen future date for one or more cells in the network. In an embodiment, the predicted network traffic conditions include predicted values for one or more key performance indicators (KPIs), which are described in greater detail below.

As described herein, the server may calculate the predicted network conditions based on historical performance data, an estimated voice and/or data traffic growth rate, frequencies identified as available for use by the network operator in the future and/or the like. Traffic growth may be positive or negative. For example, the server may receive historical performance data for a geographical region that the user is viewing. The user may then identify one or more KPIs that are of interest to the user. The server may use machine learning techniques to produce a set of model parameters. As an example, the model parameters may represent coefficients for various KPIs. The model parameters may be applied to baseline data (e.g., current or observed KPI values) to determine a predicted KPI value for the specific cell in the network. The above techniques may be repeated until the selected KPIs in some or all cells in the geographic region have been predicted.

In an embodiment, the predicted KPIs may be displayed in a graphical user interface (GUI). For example, the predicted KPIs may be displayed over a graphical representation of the geographic region (e.g., on a road or satellite map). Thus, the user may be able to visually identify areas in which performance levels are expected to degrade to unacceptable levels and areas in which performance levels are expected to remain at acceptable levels, and plan accordingly.

In further embodiments, the server may generate instructions based on the predicted KPIs for controlling network equipment. For example, the server may instruct network equipment to perform a power shift on a cell, adjust an antenna pattern, and/or perform like adjustments such that degradations in performance levels can be reduced or prevented.

Further, the systems and methods described herein can be implemented in any of a variety of electronic devices, including, for example, physical or virtual servers, cell phones, smart phones, personal digital assistants (PDAs), tablets, mini-tablets, laptops, desktops, and televisions, to name a few.

For purposes of summarizing this disclosure, certain aspects, advantages and novel features of several embodiments have been described herein. It is to be understood that not necessarily all such advantages can be achieved in accordance with any particular embodiment of the embodiments disclosed herein. Thus, the embodiments disclosed herein can be embodied or carried out in a manner that achieves one advantage or group of advantages as taught herein without necessarily achieving other advantages as taught or suggested herein.

Network Forecasting System Overview

FIG. 1 illustrates a block diagram of an example network forecasting system 100. As illustrated in FIG. 1, the network forecasting system 100 includes one or more user devices 110, a network 120, a network control unit 130, a network forecasting server 140, a performance data store 150, and a site configuration data store 160.

The one or more user devices 110 can each be configured to submit requests for access to network performance forecasts provided by the network forecasting server 140. Such requests can be made via the network 120. For example, the one or more user devices 110 may allow users (e.g., individuals, employees of telecommunication service providers or network operators, etc.) or automatic control units (e.g., self-optimizing network (SON) modules) to interact with the network forecasting information provided by the network forecasting server 140.

In an embodiment, the one or more user devices 110 may be computing devices. For example, one or more of the user devices 110 may be an electronic device, such as a cell phone, a smart phone, a tablet, a laptop, a personal digital assistant (PDA), a computer, a desktop, a workstation, a digital media player, a server, a terminal, a kiosk, or the like.

The one or more user devices 110 may include a microphone, a speaker, a wireless module, a camera, and/or a display.

The network control unit 130 can receive instructions to control automatically one or more pieces of network equipment. For example, the network equipment may be automatic control units (e.g., self-organizing network (SON) modules). The network control unit 130 may receive the instructions from the network forecasting server 140 via the network 120. The instructions may instruct network equipment to automatically self-optimize or self-improve parameters or behavior in response to network performance forecasts generated by the network forecasting server 140. For example, the network equipment may be instructed to change parameters, perform a power shift on a cell, adjust remotely-controlled components (e.g., an antenna pattern), and/or perform like adjustments such that degradations in performance levels can be reduced or prevented.

The network forecasting server 140 can generate network performance forecasts. For example, the network forecasting server 140 may generate the network performance forecasts based on cell-specific performance models (e.g., forecasts generated based on performance models for individual cells can be aggregated to provide forecasts for part of or all of an entire network). The cell-specific performance models may be based on historical performance data of telecommunication networks operated by one or more network operators (e.g., carriers). Historical performance data may include historical key performance indicator (KPI) values and other measurements taken from a network. For example, historical performance data may include, but are not limited to, voice dropped call rates, data dropped call rates, successful call establishment rate, successful session establishment rate, throughput, voice traffic, data traffic, neighbor traffic (e.g., neighboring cell traffic), received signal strength indication (RSSI) levels (e.g., uplink RSSI levels, downlink RSSI levels, noise floor at a site, etc.), radio resource control (RRC) attempts, transmit power, number of voice users, number of data users, parameter settings, pilot power, load threshold, code utilization, power utilization, and/or the like.

As described in greater detail below, each network performance forecast predicts a cell's network performance as the cell's level of traffic varies to detect previously hidden network problems and/or to identify an amount of traffic a particular cell can be expected to carry before the cell's network performance KPIs degrade below acceptable thresholds. A network performance forecast may be represented by one or more predicted KPI values (e.g., KPI values expected in the future). Example KPIs may include, but are not limited to, voice dropped call rates, data dropped call rates, successful call establishment rate, successful session establishment rate, throughput, voice traffic, data traffic, neighbor traffic (e.g., neighboring cell traffic), RSSI levels (e.g., uplink RSSI levels, downlink RSSI levels, etc.), RRC attempts, transmit power, number of voice users, number of data users, parameter settings, pilot power, load threshold, code utilization, power utilization, and/or the like. Furthermore, the network performance forecasts can be used to improve daily network troubleshooting and optimization. For example, users of the one or more user devices 110 can view the network performance forecasts to identify cells that are experiencing external interference (e.g., because the cells have a higher uplink noise level than can be explained by normal network traffic). As another example, the network forecasting server 140 can generate instructions based on the network performance forecasts that are used to control the operation of network equipment.

In an embodiment, the network forecasting server 140 can also generate a graphical representation of the network performance forecasts. For example, the network forecasting server 140 may generate a graphical user interface (GUI) that is viewable via a browser or other client application running on the one or more user devices 110.

The network forecasting server 140 may be a computing device. For example, the network forecasting server 140 may include one or more processors to execute one or more instructions, memory, and communication devices to transmit and receive data over the network 120. In some embodiments, the network forecasting server 140 is implemented as one or more backend servers capable of communicating over a network. In other embodiments, the network forecasting server 140 is implemented by one or more virtual machines in a hosted computing environment, such as in a cloud computing environment. The hosted computing environment may include one or more rapidly provisioned and released computing resources, which computing resources may include computing, networking and/or storage devices. A hosted computing environment may also be referred to as a cloud computing environment. In still other embodiments, the network forecasting server 140 may be represented as a user computing device capable of communicating over a network, such as a laptop or tablet computer, personal computer, personal digital assistant (PDA), hybrid PDA/mobile phone, mobile phone, global positioning system (GPS) device, or the like. The network forecasting server 140 may be in communication with one or a plurality of user devices 110.

The network forecasting server 140 may be in communication with the performance data store 150 via the network 120. In an embodiment, the performance data store 150 stores historical performance data of telecommunication networks operated by one or more network operators. The network forecasting server 140 may access historical performance data stored in the performance data store 150 in generating network performance forecasts. In some embodiments, the performance data store 150 is a single data store. In other embodiments, the performance data store 150 includes multiple physical storage devices distributed over many different locations.

In an embodiment, the site configuration data store 160 stores site configuration data for network equipment in telecommunication networks operated by one or more network operators. For example, site configuration data may include, but is not limited to, cell site latitude, longitude, antenna type, azimuth (e.g., direction), frequency, radio network controller (RNC), and/or the like. In some embodiments, the site configuration data store 160 is a single data store. In other embodiments, the site configuration data store 160 includes multiple physical storage devices distributed over many different locations. The site configuration data may be used to depict the network (e.g., pie wedges as described below) in a user interface (e.g., the example user interfaces in FIGS. 7-10) and/or may be used when determining network performance forecasts (e.g., may be used as inputs in a machine learning model).

The network 120 may be a wired network, a wireless network, or a combination of the two. For example, the network 120 may be a personal area network, a local area network (LAN), a wide area network (WAN), or combinations of the same. Protocols and components for communicating via any of the other aforementioned types of communication networks, such as the TCP/IP protocols, can be used in the network 120.

Network Performance Forecasts

Figure 2:
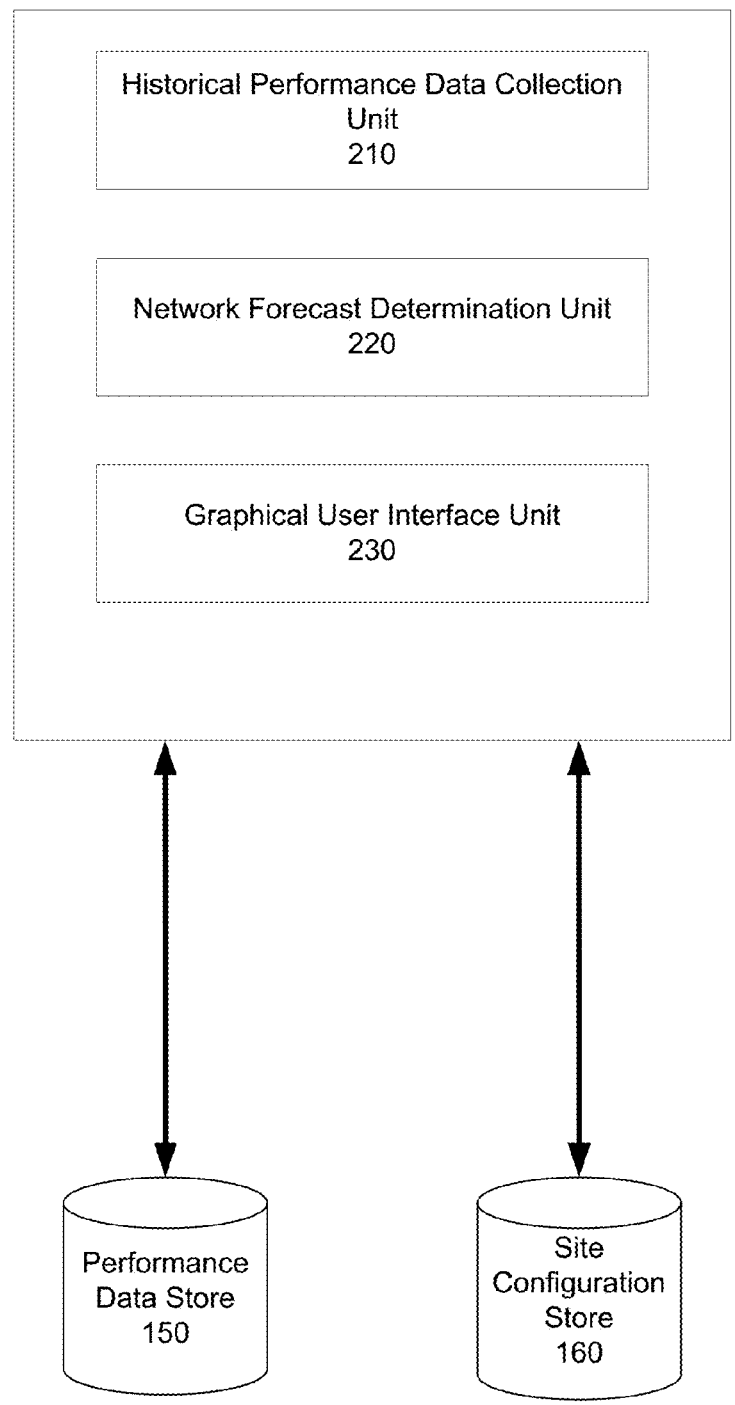
FIG. 2 illustrates an example of a more detailed block diagram of the network forecasting server of FIG. 1.

FIG. 2 illustrates an example of a more detailed block diagram of the network forecasting server 140 of FIG. 1. As illustrated in FIG. 2, the network forecasting server 140 may include a historical performance data collection unit 210, a network forecast determination unit 220, and a graphical user interface (GUI) unit 230.

In an embodiment, the historical performance data collection unit 210 can collect historical performance data stored in the performance data store 150. The historical performance data collection unit 210 may collect historical performance data for a set period of time (e.g., one week, one month, one year, etc.). The historical performance data collected may depend on the user requesting permission to access the network performance forecasts. For example, the historical performance data collection unit 210 may collect historical performance data associated with a first carrier if the user requesting permission to access the network performance forecasts is associated with the first carrier. In some embodiments, the historical performance data collection unit 210 collects the historical performance data at the same time or nearly the same time as the network forecasting server 140 receives a request for network performance forecasts. In other embodiments, the historical performance data collection unit 210 collects the historical performance data at a time before the network forecasting server 140 receives a request for network performance forecasts.

The network forecast determination unit 220 can generate network performance forecasts. Each network performance forecast may be specific to a cell in a cellular network or may encompass a plurality of cells in the cellular network. The network forecast determination unit 220 may be configured to generate a plurality of network performance forecasts to cover a geographic area selected by a user. In an embodiment, the network forecast determination unit 220 receives a selection of one or more KPIs. For example, a user operating a user device 110 may select one or more KPIs that are of interest (e.g., a user may be interested in the impact of rising traffic on the dropped call rate).

In some embodiments, once one or more KPIs are selected, the network forecast determination unit 220 identifies relationships between KPIs before beginning the process of generating network performance forecasts. For example, the relationships between KPIs may be unknown (e.g., network performance forecasts are to be generated for a wireless standard or network for the first time). In other embodiments, the network forecast determination unit 220 begins generating network performance forecasts once one or more KPIs are selected. For example, the relationships between KPIs may have been determined already at a previous time or received from another device.

The network forecast determination unit 220 may identify relationships between KPIs using machine-learning techniques on one or more KPIs. Machine-learning techniques may include statistical correlation analyses, regression analyses (e.g., multiple regression analyses, linear regression analyses, logistic regression analyses, etc.), neural networks, combinations of the same, or the like. In some embodiments, machine learning is performed on at least one selected KPI and at least one unselected KPI. In other embodiments, machine-learning is performed on only the selected KPIs. As an example, the network forecast determination unit 220 may use a statistical correlation analysis that compares each analyzed KPI with some or all other analyzed KPIs. As used herein, the term "correlation," in addition to having its ordinary meaning, can refer to calculation of a specific correlation value or coefficient or more generally to a numerical comparison (e.g., of KPIs) that does not necessarily require calculation of a mathematically-defined correlation coefficient. The result of the statistical correlation analysis may indicate the sensitivity of each analyzed KPI to the other analyzed KPIs. For example, the network forecast determination unit 220 may analyze the result of the statistical correlation analysis to determine which KPIs are most sensitive to other KPIs. The network forecast determination unit 220 may focus the analysis of the results on the one or more selected KPIs. In other embodiments, the statistical analysis that may be performed by the network forecast determination unit 220 may also include other statistical parameters or operations, such as a mean, median, mode, variance, standard deviation, regression, or other numerical calculation based on one or more KPIs.

In an embodiment, the network forecast determination unit 220 determines a relationship between two or more KPIs based on the result of the statistical correlation analysis. For example, the data set of each selected KPI may be compared with the data sets for one or more remaining KPIs individually (e.g., a pair of KPIs may be compared at a time). A KPI data set may include KPI values collected over a period of time (e.g., hourly, daily, etc.). The network forecast determination unit 220 may mathematically determine whether the relationship between KPIs is linear, exponential, logarithmic, or has some other type of relationship.

In some embodiments, the network forecast determination unit 220 generates one or more charts that include a result of the KPI comparisons. FIG. 3 illustrates an example chart 300 that depicts a set of example statistical correlation analysis results. The chart 300 indicates, for example, that data traffic and uplink RSSI KPIs have a positive correlation and data traffic and voice access success rate KPIs have a negative correlation. The chart 300 may be provided to an analyst (e.g., an individual trained to identify relationships between KPIs based on machine learning results), not shown, for further analysis. The results of the analysis performed by the analyst may be relayed to the one or more user devices 110 via the network forecasting server 140.

Figure 4:
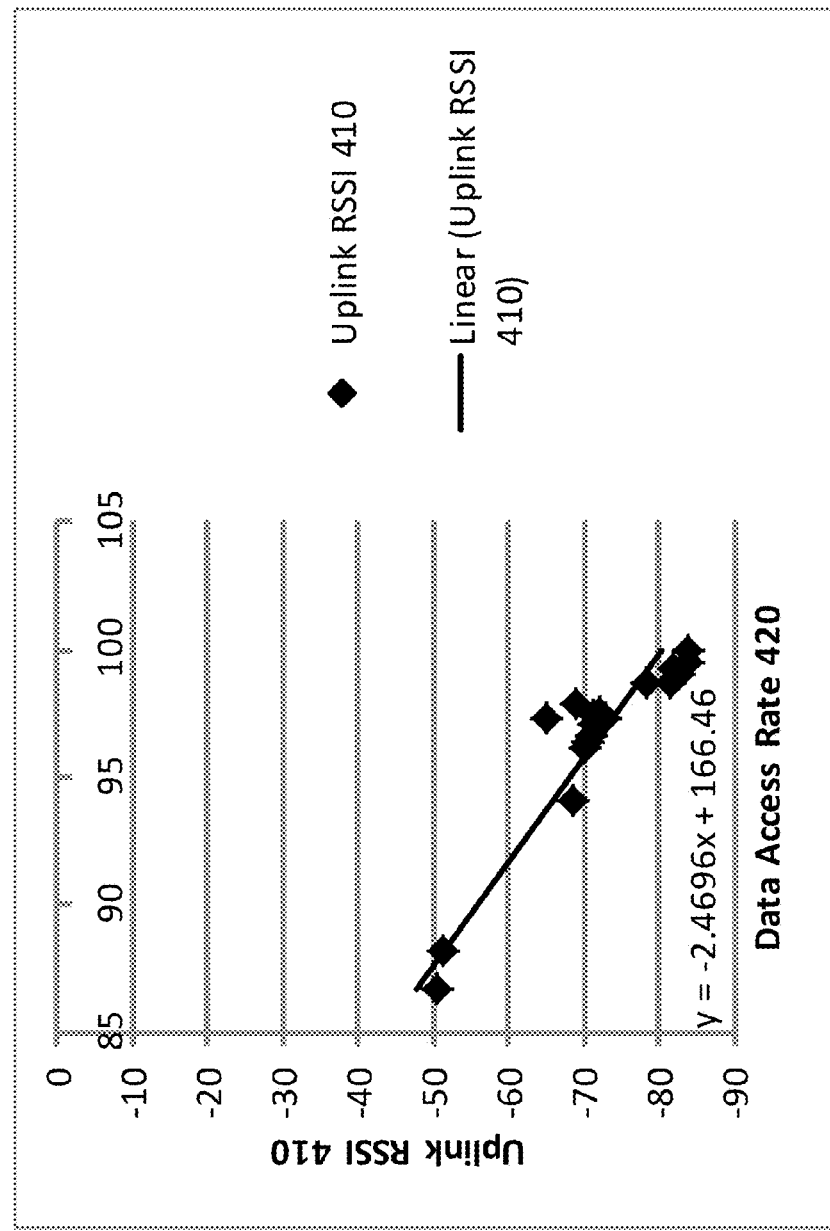
FIG. 4 illustrates an example analysis of two KPIs.

FIG. 4 illustrates an example chart 400 depicting analysis of two example KPIs. As illustrated in FIG. 4, uplink RSSI 410 is plotted against data access rate 420. The uplink RSSI 410 and the data access rate 420 have a linear relationship in the depicted example.

In an embodiment, the network forecast determination unit 220 uses the identified relationships when generating the network performance forecasts. Machine learning may also be used to generate the network performance forecasts. For example, the network forecast determination unit 220 may use a multiple regression analysis on one or more KPIs.

For example, the network forecast determination unit 220 may perform a multiple regression analysis with KPIs used as independent and dependent variables. In some embodiments, the relationships identified between KPIs are used as a guide to determine which KPIs are used as independent variables and which KPIs are used as dependent variables (e.g., KPIs that have a strong correlation may be used as independent variables, etc.). As an example, each selected KPI may be used as a dependent variable and some or all of the remaining KPIs may be used as independent variables. The independent variables may be isolated from semi-independent and dependent variables as this may play a useful role in the selection of historical performance data and KPIs. The network forecast determination unit 220 may improve the machine learning model by using interaction terms or other corrective factors (e.g., adjusting the source data to exponential or other non-linear methods to capture the inter-KPI relationship observed when mathematically analyzing or charting the data). The quality of the machine learning model may be measured using a coefficient of determination ($R^2$), standard error, the Pearson correlation coefficient, or other measurements.

In an embodiment, the network forecast determination unit 220 sets filter criteria to manipulate the historical performance data. The filter criteria may be used to manipulate the historical performance data before any such data is used to generate the network performance forecasts. For example, the filter criteria may be set based on a baseline range of measurements taken in a network. If a portion of the historical performance data falls outside of the baseline range, the portion may be removed or adjusted. The filter criteria may vary based on the KPI, technology used by the carrier, and/or the carrier requested network performance forecasts. In addition, individual cell busy hour, market busy hour, 24 hour, or other timeframes may be selected to vary the loading performance of a cell based on voice erlangs and traffic megabytes.

The network forecast determination unit 220 may generate nested machine learning models. In an embodiment, the network forecast determination unit 220 recursively applies machine learning. For example, the network forecast determination unit 220 may apply machine learning to generate a first output. Machine learning may be applied again to generate additional outputs. Machine learning then may be applied again, with the first and/or additional outputs being used as coefficients for a dependent or independent variable. In addition, the network forecast determination unit 220 may correlate noise level measurements and power measurements with at least some performance measurements and at least some KPIs to better predict performance measurements or semi-independent KPIs to the noise level. In an embodiment, the network forecast determination unit 220 correlates the noise level measurement and the power measurement to the final performance KPIs.

The network forecast determination unit 220 may revise the machine learning model used to generate the network performance forecasts. Revisions may occur via the addition of independent variables (e.g., KPIs, parameter settings, etc.) or the removal of independent variables. In an embodiment, the network forecast determination unit 220 filters and/or weights the machine learning model input data to exclude incorrect data or data which is degrading the model. Once any filtering or weighting is complete, the machine learning is performed and key model parameters are recorded for the respective cell. For example, key model parameters (e.g., when a multiple regression analysis is performed) may include the intercept and/or coefficients for all independent variables.

Once the network forecast determination unit 220 performs the machine learning, the network forecast determination unit 220 may generate a matrix for each cell in the geographic area selected by the user. FIG. 5 illustrates an example matrix 500 generated by the network forecast determination unit 220. The matrix may include example machine learning model information (e.g., the key model parameters), which can be used to predict each important or desired KPI. In an embodiment, the network forecast determination unit 220 applies the matrix coefficients to baseline data for the respective cell to determine one or more predicted KPIs (e.g., an estimated value for a KPI selected by the user). The baseline data for a cell may include measured performance data for on-air cells and/or estimated data for new cells not yet on-air. The baseline data may be stored in the performance data store 150, stored in another data store (not shown), and/or provided by the user. For example, in a multiple regression analysis model applied to an on-air cell, the network forecast determination unit 220 may calculate a predicted KPI as the intercept of the model plus the product of each independent variable coefficient and the cell's historical baseline data. As a further example, to calculate the predicted KPI as traffic is varied, the network forecast determination unit 220 can increase or decrease the traffic baseline data and can apply the matrix coefficients to the new traffic baseline data. An example predicted dropped call rate for one cell using a multiple regression analysis model is provided below in equation (1) (with coefficients derived from the model, which may vary in other implementations):

$$\text{Dropped Call Rate} = 370.6 - 4.691(\text{total traffic}) + \qquad (1)$$
$$1.302(UL\ RSSI) - 0.05191(\text{total traffic} \times UL\ RSSI) -$$
$$0.5418(\text{power}) + 0.2986(\text{load threshold}) + 1.361(\text{offset})$$

In an embodiment, the network forecast determination unit 220 performs a verification test on one or more KPIs in a cell (e.g., a verification test is performed on each cell's machine learning model). The verification test may ensure or attempt to ensure that as traffic increases, the performance KPIs degrade. If the verification test indicates that a cell's model is not responding as expected, the cell may be labeled as a bad cell. A cell's model may fail the verification test as a result of missing counters, missing statistics, outages, or other reasons. Data for the bad cell may be replaced with new data and new models may be generated using the new data. If the new models fail the verification test, then the network forecast determination unit 220 may assign a default model to the cell. The default model may be generated from RNC, base station controller (BSC), mobility management entity (MME), and/or area models that depict similar cells in similar morphology and/or topology.

Figure 6:
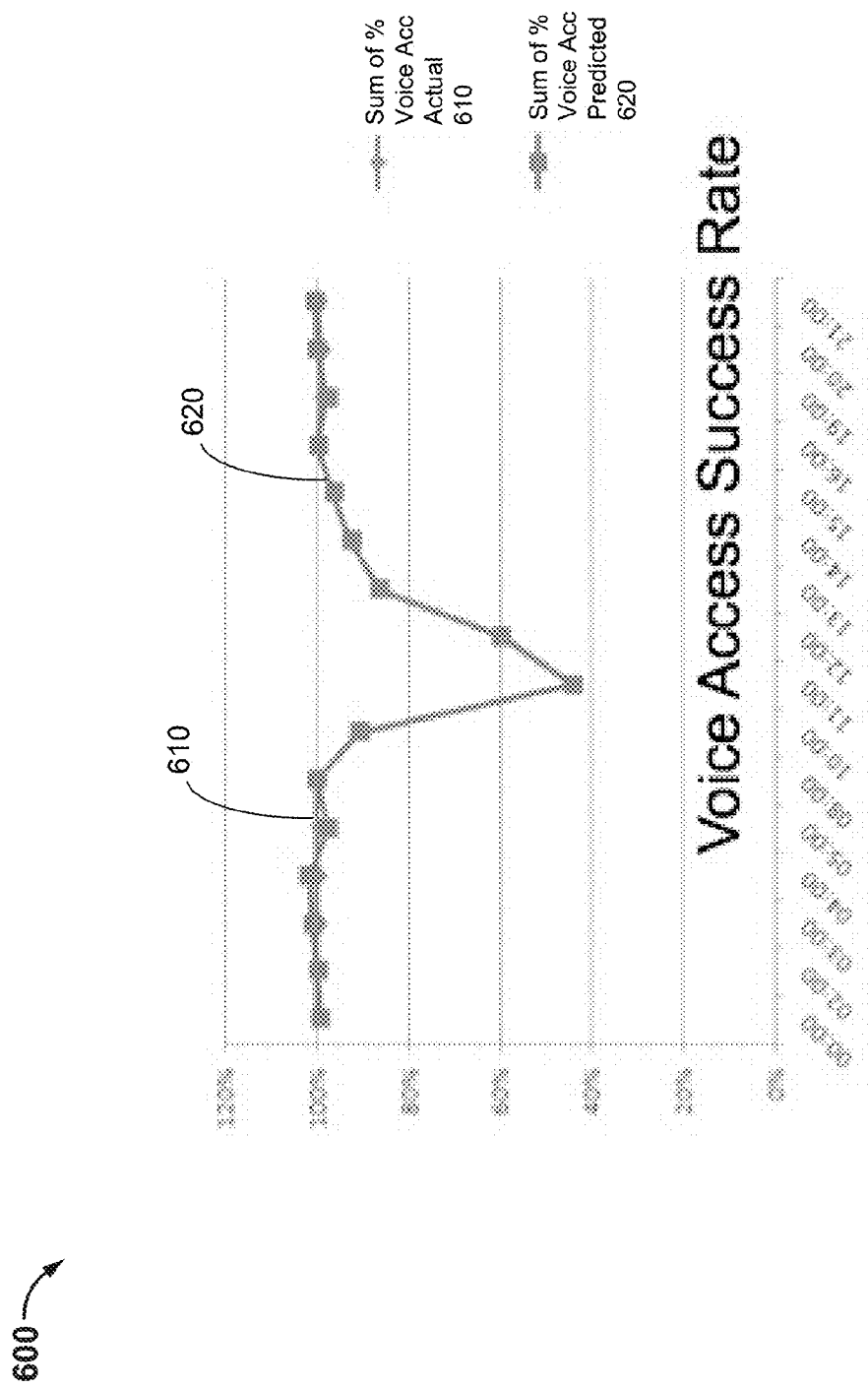
FIG. 6 illustrates an example graph that compares predicted performance of a KPI and actual performance of a KPI on a cell.

FIG. 6 illustrates an example graph 600 that compares predicted performance 620 of a KPI and actual performance 610 of a KPI on a cell with respect to time. As illustrated in FIG. 6, a dramatic rise in traffic occurred around 12:00, causing congestion. Graph 600 indicates that the predicted performance 620 may be very close to the actual performance 610 (e.g., $R^2$=0.996, standard error=2.7%).

The network forecast determination unit 220 may send instructions derived from the predicted KPI values to the network control unit 130. The network control unit 130 may instruct a SON module to direct automatic changes to the network, such as parameter or power changes or adjustments to remotely-controlled components (e.g., antennas).

The network forecast determination unit 220 may also send the predicted KPI values to the one or more user devices 110 and/or the GUI unit 230. In some embodiments, the predicted KPI values are provided to the one or more user devices 110 in a table format (e.g., via an exportable file). In other embodiments, the predicted KPI values are output visually in a GUI generated by the GUI unit 230 and accessible via a browser or other client application running on the one of more user devices 110. Example GUIs generated by the GUI unit 230 are described in greater detail below with respect to FIGS. 7-10.

Example GUIs

FIGS. 7 through 10 depict example user interfaces or GUIs that may be output by the systems or processes described above. Each of the user interfaces shown includes one or more user interface controls that can be selected by a user, for example, using a browser or other application software. The user interface controls shown are merely illustrative examples and can be varied in other embodiments. For instance, buttons, dropdown boxes, select boxes, text boxes, check boxes, slider controls, and other user interface controls shown, may be substituted with other types of user interface controls that provide the same or similar functionality. Further, user interface controls may be combined or divided into other sets of user interface controls such that similar functionality or the same functionality may be provided with different looking user interfaces. Moreover, each of the user interface controls may be selected by a user using one or more input options, such as a mouse, touch screen input, or keyboard input, among other user interface input options.

Figure 7:
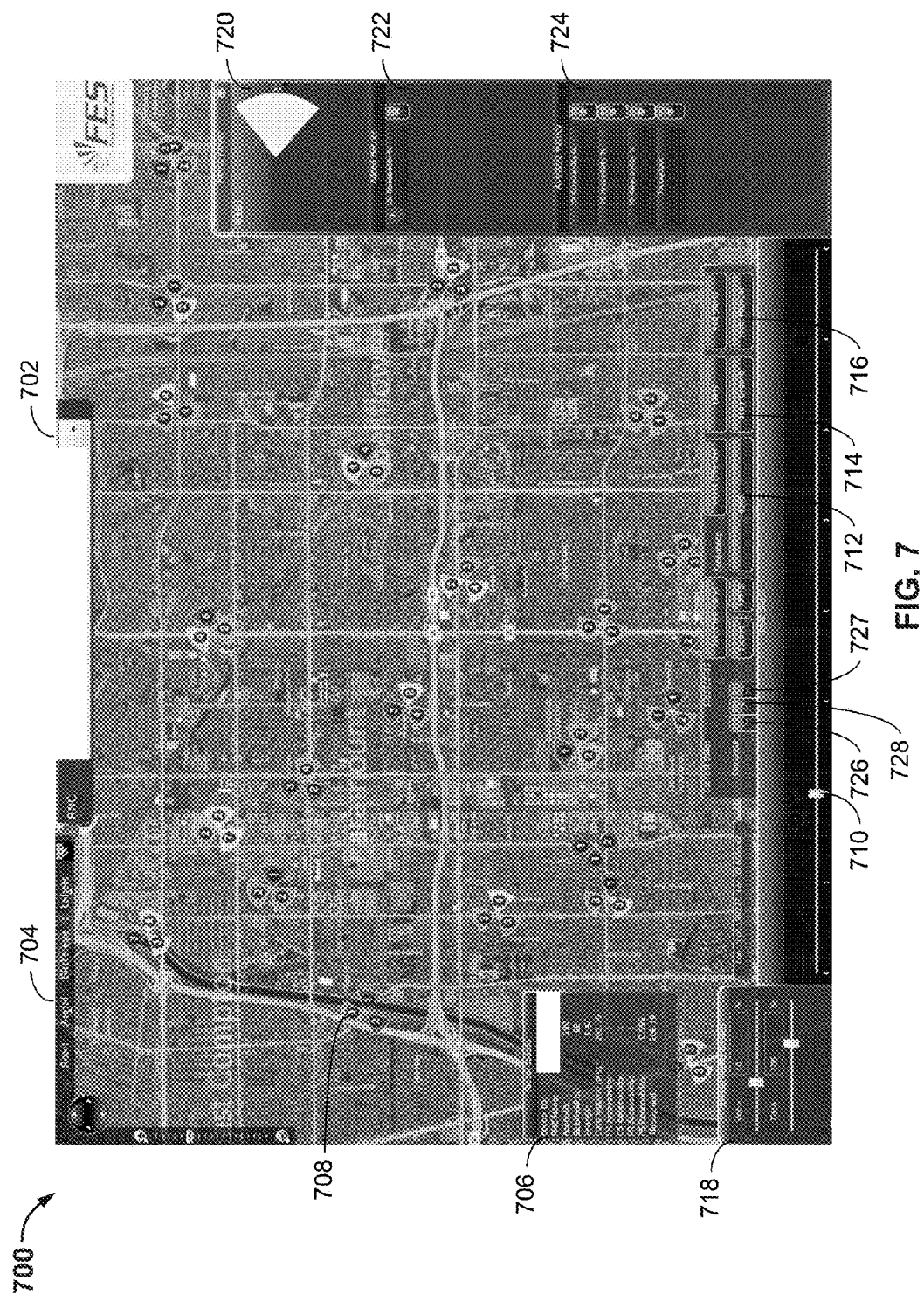
FIG. 7 illustrates an example GUI generated by the GUI unit.

FIG. 7 illustrates an example GUI 700 that may be generated by the GUI unit 230. As illustrated in FIG. 7, the GUI 700 includes several interactive features that allow a user to view network performance forecasts for a current date or a date in the future. For example, a user can select one or more RNCs using dropdown box 702, view one or more map views using options 704 (e.g., road view, aerial view, bird's eye view, etc.), view sector details (e.g., sector information, predicted KPI values, etc.) in window 706 by hovering over or selecting a sector in the GUI 700, change which spectrum frequencies (or carriers or bands) are viewable using button 712, hide or view labels 708 depicting planned capacity (e.g., a planned future carrier count in a cell of a sector) using button 716, adjust annual voice and/or data traffic growth rate via box 718, adjust a date of the desired network performance forecast using slider 710 (e.g., the slider 710 may step forward and/or backward in daily increments), back button 726, or forward button 727, select play button 728 to view KPIs change over time, select user growth button 714 to view the network operator's forecasted traffic, show additional KPIs simultaneously by selecting an available KPI in box 724 (e.g., circuit switch (CS) retainability percentage, packet switched (PS) accessibility percentage, PS retainability percentage, throughput, etc.), and/or remove KPIs by selecting a KPI in box 722 (e.g., CS accessibility percentage).

In addition, a user can display one or more carriers simultaneously, choose to view KPIs in 24 hour or market busy hour timeframes, and/or export data (e.g., predicted KPIs for a chosen future date and growth rate, first date at which each cell will fall below a threshold that indicates an acceptable KPI performance level, cells or sectors that are the worst offenders, etc.). In some embodiments, each cell in a sector is represented by color-coded pie wedges to indicate the KPI performance level (e.g., for the selected KPI(s)). For example, green may indicate an acceptable and high KPI performance level, yellow may indicate an acceptable and medium KPI performance level, and red may indicate an unacceptable and low KPI performance level. As described above, each cell may include a label 708 that includes a number depicting planned capacity in the respective cell. A user may also carve spectrum, which removes one or more frequencies and distributes the traffic from those frequencies to the remaining frequencies and shows the predicted performance on the remaining frequencies.

Figure 8:
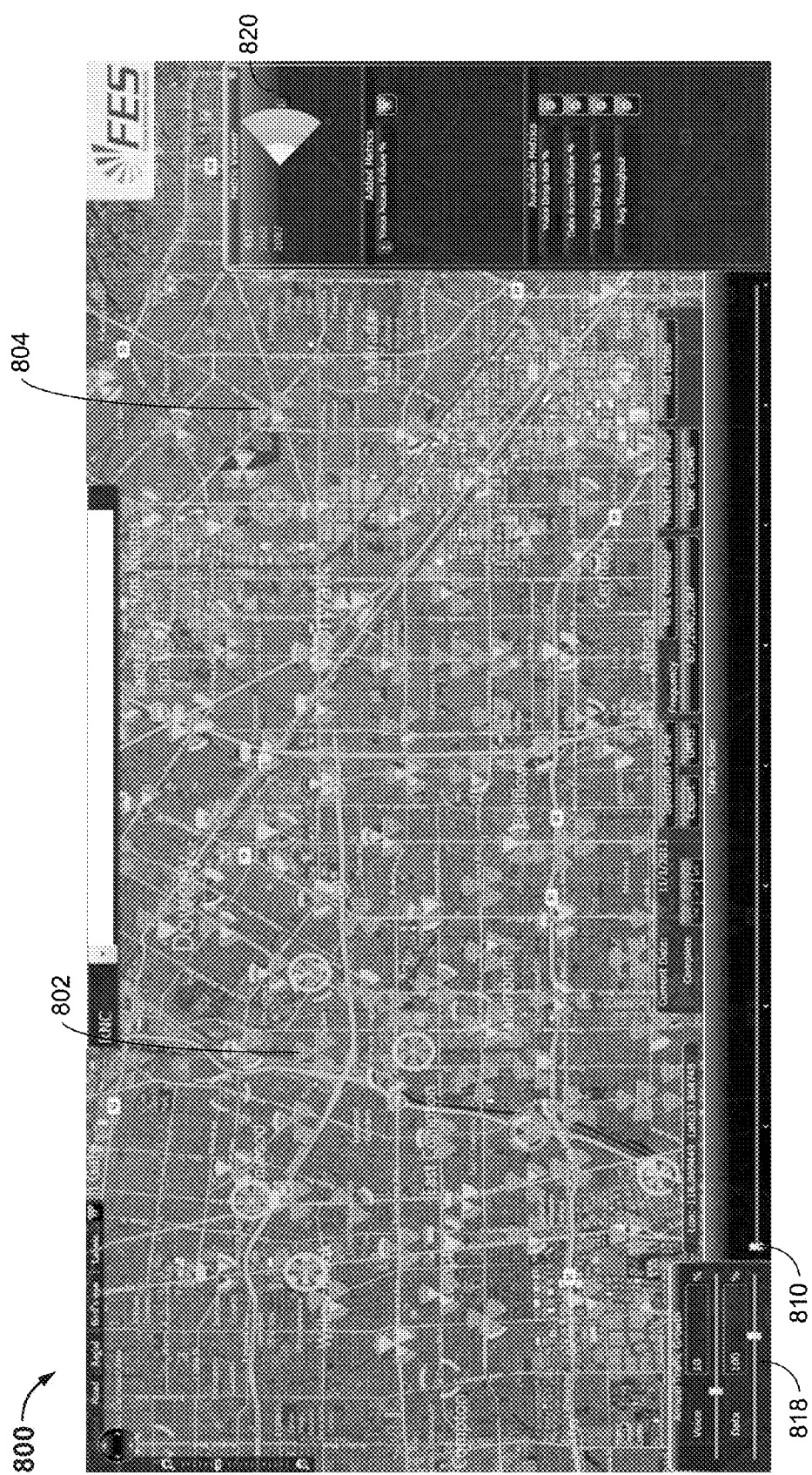
FIG. 8 illustrates another example GUI generated by the GUI unit.

FIG. 8 illustrates another example GUI 800 generated by the GUI unit 230. As illustrated in FIG. 8, a sector, such as sector 804, includes one or more cells in a pie-shaped configuration. Each cell may be divided into concentric segments or rings that each represent the performance level of different frequencies. For example, three frequencies (e.g., channels 637, 2062, and 2087) are displayed in each cell. Cell 802 is displayed as having an acceptable and high KPI performance level. In addition, in box 818, the annual voice traffic growth rate is set at 10% and the annual data traffic growth rate is set at 100%. Slider 810 is set at a current date (e.g., Nov. 1, 2013).

Figure 9:
FIG. 9 illustrates another example GUI generated by the GUI unit.

FIG. 9 illustrates another example GUI 900 generated by the GUI unit 230. As illustrated in FIG. 9, the slider 810 is stepped forward one year (e.g., to Nov. 1, 2014). Accordingly, the predicted KPI values in each cell are adjusted based on the analysis performed by the network forecast determination unit 220 described above and the growth rates selected by the user. In some embodiments, the predicted KPI values are calculated as the slider 810 is adjusted. In other embodiments, some or all possible predicted KPI values are calculated before the GUI 900 is presented to the user. As an example, a frequency (e.g., channel 2062) of the cell 802 is displayed as having an acceptable and medium KPI performance level once slider 810 is adjusted from the position as illustrated in FIG. 8.

Figure 10:
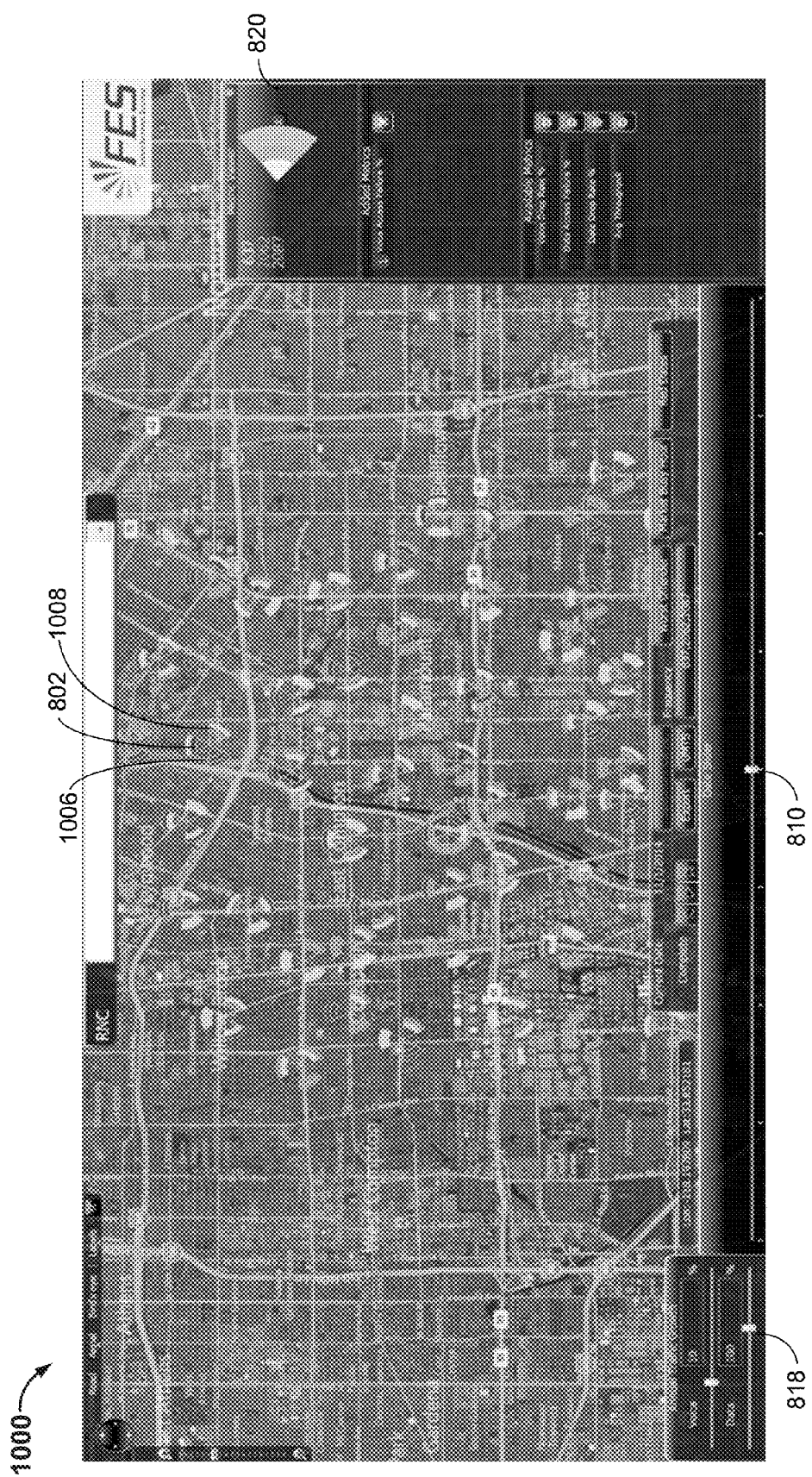
FIG. 10 illustrates another example GUI generated by the GUI unit.

FIG. 10 illustrates another example GUI 1000 generated by the GUI unit 230. As illustrated in FIG. 10, the slider 810 remains in the same position as illustrated in FIG. 9. However, the spectrum carve feature has been selected such that one frequency is removed (e.g., channel 637) and the traffic from the removed frequency is distributed to the remaining frequencies equally, nearly equally, or based on expected loads and/or traffic patterns. For example, sector 1006 includes three cells. The inner concentric ring of each cell in sector 1006 is shown as being transparent (e.g., rather than a color indicating performance levels), indicating that the frequency band associated with that concentric ring has been removed. Due to the removal of spectrum, an expected load on the cell 802, and/or other factors, a frequency (e.g., channel 2062) of the cell 802 is now displayed as having an unacceptable and low KPI performance level. However, removal of spectrum does not necessarily mean that the performance level of a cell will degrade. Depending on an expected load on a cell and/or other factors, a cell may be able to maintain performance levels even with the removal of spectrum. For example, channel 637 is also carved from the cell 1008 and distributed to the remaining frequencies. Yet, the performance levels of the remaining frequencies are unchanged despite the removal of spectrum.

Flowchart

Figure 11:
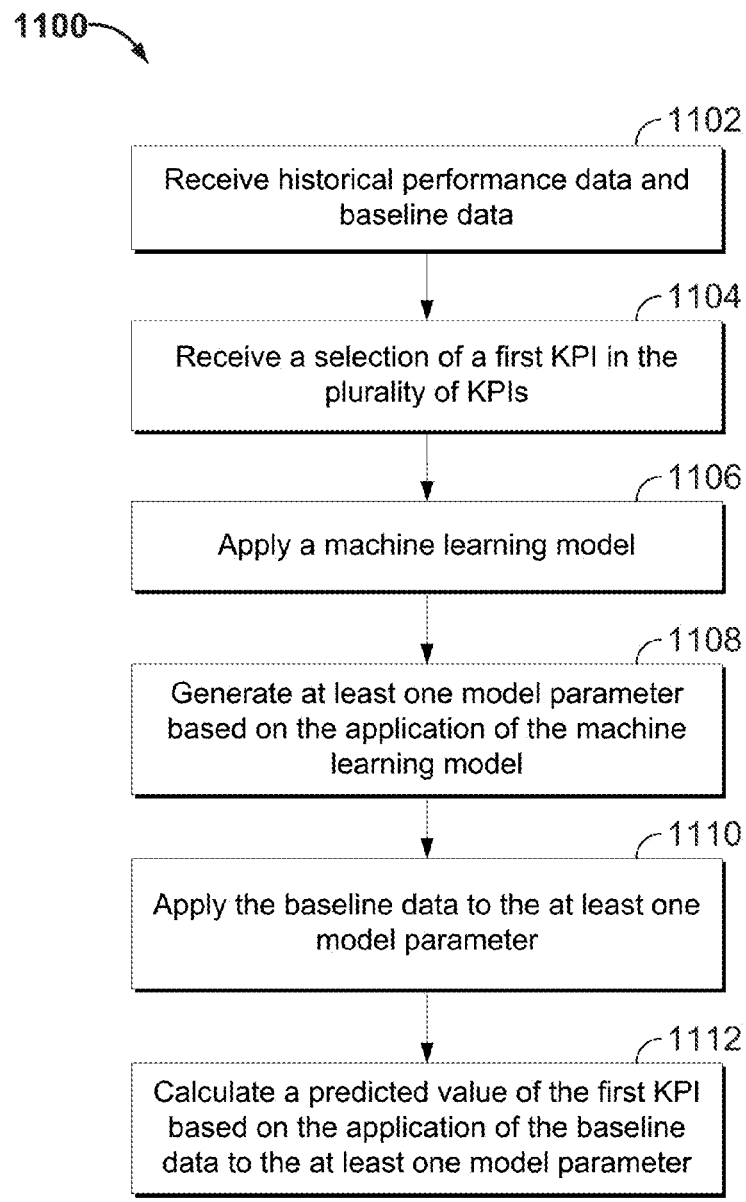
FIG. 11 illustrates a flowchart of an embodiment of a method for forecasting network performance.

FIG. 11 illustrates a flowchart of an example method 1100 for forecasting network performance. In an embodiment, the method 1100 can be performed by the network forecasting server 140 discussed above with respect to FIGS. 1 and 2 or any other computing device. Depending on the embodiment, the method 1100 may include fewer and/or additional blocks and the blocks may be performed in an order different than illustrated.

In block 1102, historical performance data and baseline data are received. In an embodiment, the historical performance data includes a plurality of KPIs.

In block 1104, a selection of a first KPI in the plurality of KPIs is received. In an embodiment, the selection may be received from a user operating a user device, such as a user device 110.

In block 1106, a machine learning model is applied. In an embodiment, the machine learning model is applied to the first KPI and at least one KPI in the plurality of KPIs. In a further embodiment, the machine learning model is a multiple regression analysis model, although the machine learning model may be any of the machine learning models described above.

In block 1108, at least one model parameter is generated based on the application of the machine learning model. In an embodiment, a model parameter may be a coefficient produced by the machine learning model, where the coefficient is of an independent variable used in the machine learning model.

In block 1110, the baseline data is applied to the at least one model parameter. In block 1112, a predicted value of the first KPI is calculated based on the application of the baseline data to the at least one model parameter.

ADDITIONAL EMBODIMENTS

One aspect of the disclosure provides a computer-implemented method of forecasting wireless network performance. The method comprises receiving historical performance data and baseline data for a cell in a network. The historical performance data may comprise a plurality of key performance indicators (KPIs). The method further comprises receiving, from a user, a selection of a first KPI in the plurality of KPIs. The method further comprises applying a machine learning model to the first KPI and at least one KPI in the plurality of KPIs. The method further comprises generating at least one model parameter based on application of the machine learning model. The method further comprises applying the baseline data to the at least one model parameter. The method further comprises calculating a predicted value of the first KPI for the cell in the network based on the application of the baseline data to the at least one model parameter. At least said calculating may be performed by a computer system comprising computer hardware.

The method of the preceding paragraph can have any sub-combination of the following features: verifying accuracy of results of the application of the machine learning model; or wherein the plurality of KPIs comprises at least one of voice dropped call rates, data dropped call rates, successful call establishment rate, successful session establishment rate, throughput, voice traffic, data traffic, neighbor traffic, uplink RSSI levels, downlink RSSI levels, RRC attempts, transmit power, number of voice users, number of data users, parameter settings, pilot power, code utilization, power utilization, or load threshold.

Another aspect of the disclosure provides a system comprising a computer data repository that stores historical performance data for a cell in a network. The system further comprises a computing system comprising one or more computing devices, the computing system in communication with the computer data repository. The computing system may be programmed to implement a historical performance data collection unit configured to receive the historical performance data, the historical performance data comprising a plurality of key performance indicators (KPIs). The computing system may be further programmed to implement a network forecast determination unit configured to receive a selection of a first KPI in the plurality of KPIs. The network forecast determination unit may be further configured to apply a machine learning model to at least the first KPI to produce a model parameter and calculate a predicted value of the first KPI for the cell in the network based on the model parameter.

The system of the preceding paragraph can have any sub-combination of the following features: where the network forecast determination unit is further configured to generate instructions based on the predicted value of the first KPI; a network control unit configured to instruct a self-organizing network module to adjust a parameter based on the generated instructions; where the network forecast determination unit is further configured to verify accuracy of results of the application of the machine learning model; or where the plurality of KPIs comprises at least one of voice dropped call rates, data dropped call rates, successful call establishment rate, successful session establishment rate, throughput, voice traffic, data traffic, neighbor traffic, uplink RSSI levels, downlink RSSI levels, RRC attempts, transmit power, number of voice users, number of data users, parameter settings, pilot power, code utilization, power utilization, or load threshold.

Terminology

Some or all of the methods and tasks described above may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a hardware processor (or multiple hardware processors) that executes program instructions or modules stored in a memory or other computer-readable storage medium. Each such processor includes digital logic circuitry. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

For example, the functional components 110, 120, 130, and 140 shown in FIG. 1 may be implemented by a programmed computer system that comprises one or more physical computers or computing devices. Different components 110, 120, 130, and 140 may, but need not, be implemented on or by different physical machines. The data repositories 150 and 160 shown in FIG. 1 may be implemented as databases, flat files, and/or any other type of computer-based storage system that uses persistent data storage devices to store data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The foregoing embodiments are intended to be non-limiting. Other embodiments, including embodiments that do not provide all of the benefits and features set forth herein, are also within the scope of protection. Accordingly, the scope of protection is defined only by reference to the appended claims.

What is claimed is:

1. A computer-implemented method of forecasting wireless network performance, the method comprising:
    receiving historical performance data and baseline data for a cell in a network, wherein the historical performance data comprises a plurality of key performance indicators (KPIs);
    receiving, from a user, a selection of a first KPI in the plurality of KPIs;
    applying a machine learning model to the first KPI and a second KPI in the plurality of KPIs to identify a relationship between the first KPI and the second KPI;
    applying the machine learning model to the first KPI and a third KPI in the plurality of KPIs to identify a second relationship between the first KPI and the third KPI;
    determining that a correlation between the first KPI and the third KPI is greater than a threshold correlation value based on the identified second relationship;
    generating a first model parameter based on the identified relationship between the first KPI and the second KPI;
    generating a second model parameter based on the identified second relationship between the first KPI and the third KPI in response to the determination that the correlation between the first KPI and the third KPI is greater than the threshold correlation value;
    applying the baseline data to the first model parameter and the second model parameter; and
    calculating a predicted value of the first KPI for the cell in the network based on the application of the baseline data to the first model parameter and the second model parameter;
    wherein at least said calculating is performed by a computer system comprising computer hardware.

2. The computer-implemented method of claim 1, further comprising:
    receiving a selection of a date in the future;
    receiving a selection of an estimated traffic growth rate;
    adjusting the baseline data based on the selected date and the estimated traffic growth rate;
    applying the adjusted baseline data to the first model parameter; and calculating a second predicted value of the first KPI for the cell in the network based on the application of the adjusted baseline data to the first model parameter.

3. The computer-implemented method of claim 1, wherein the machine learning model comprises a statistical correlation analysis model.

4. The computer-implemented method of claim 1, further comprising:
filtering the historical performance data based on a subset of the historical performance data identified as being incorrect; and
applying the machine learning model based on the filtered historical performance data.

5. The computer-implemented method of claim 1, further comprising transmitting data to an application running on a general purpose computer, the data including information for displaying the predicted value of the first KPI in a graphical user interface.

6. The computer-implemented method of claim 5, wherein the data includes information for displaying the predicted value of the first KPI over a graphical representation of a geographic location.

7. The computer-implemented method of claim 1, wherein the machine learning model comprises a multiple regression analysis model.

8. The computer-implemented method of claim 1, wherein the plurality of KPIs comprises at least one of voice dropped call rates, data dropped call rates, successful call establishment rate, successful session establishment rate, throughput, voice traffic, data traffic, neighbor traffic, uplink received signal strength indication (RSSI) levels, downlink RSSI levels, radio resource control (RRC) attempts, transmit power, number of voice users, number of data users, or parameter settings.

9. The computer-implemented method of claim 1, further comprising:
receiving, from the user, an indication to remove a first frequency from the cell, wherein the cell comprises the first frequency, a second frequency, and a third frequency, and wherein the predicted value of the first KPI for the cell comprises a first predicted value of the first KPI for the first frequency, a second predicted value of the second KPI for the second frequency, and a third predicted value of the first KPI for the third frequency;
distributing network traffic associated with the first frequency to the second frequency and the third frequency;
determining an updated second predicted value of the first KPI and an updated third predicted value of the first KPI based on the distribution of the network traffic and based on the application of the baseline data to the first model parameter and the second model parameter.

10. The computer-implemented method of claim 1, wherein the second KPI comprises one of data traffic, voice traffic, or number of users, wherein the performance data comprises a first value for the second KPI at a first time, wherein the baseline data comprises a second value for the second KPI, wherein the second value corresponds to a second time different from the first time, and wherein the computer-implemented method further comprises:
receiving, from the user, a selection of a third value for the second KPI, wherein the third value corresponds to the second time, and wherein the third value is double the first value;
modifying the baseline data such that the modified baseline data comprises the third value for the second KPI; and calculating the predicted value of the first KPI for the cell in the network based on at least a product of the first model parameter and the third value.

11. A system comprising:
a computer data repository that stores historical performance data for a cell in a network;
a second computer data repository that stores baseline data for the cell in the network;
a computing system comprising one or more computing devices, the computing system in communication with the computer data repository, the computing system programmed to implement:
a historical performance data collection unit configured to receive the historical performance data and the baseline data, the historical performance data comprising a plurality of key performance indicators (KPIs); and
a network forecast determination unit configured to receive a selection of a first KPI in the plurality of KPIs, the network forecast determination unit further configured to:
apply a machine learning model to at least the first KPI and a second KPI in the plurality of KPIs to identify a relationship between the first KPI and the second KPI,
apply the machine learning model to the first KPI and a third KPI in the plurality of KPIs to identify a second relationship between the first KPI and the third KPI,
determine that a correlation between the first KPI and the third KPI is greater than a threshold correlation value based on the identified second relationship,
generate a first model parameter based on the identified relationship between the first KPI and the second KPI,
generate a second model parameter based on the identified second relationship between the first KPI and the third KPI in response to the determination that the correlation between the first KPI and the third KPI is greater than the threshold correlation value,
apply the baseline data to the first model parameter and the second model parameter, and
calculate a predicted value of the first KPI for the cell in the network based on the application of the baseline data to the first model parameter and the second model parameter.

12. The system of claim 11, wherein the network forecast determination unit is further configured to:
receive a selection of a date in the future;
receive a selection of an estimated traffic growth rate;
adjust the baseline data based on the selected date and the estimated traffic growth rate;
apply the adjusted baseline data to the first model parameter; and
calculate a second predicted value of the first KPI for the cell in the network based on the application of the adjusted baseline data to the first model parameter.

13. The system of claim 11, wherein the computing system is further programmed to implement a graphical user interface unit configured to transmit data to an application running on a general purpose computer, the data including information for displaying the predicted value of the first KPI in a graphical user interface.

14. The system of claim 13, wherein the data includes information for displaying the predicted value of the first KPI over a graphical representation of a geographic location.

15. The system of claim 11, wherein the machine learning model comprises a multiple regression analysis model.

16. The system of claim 11, wherein the plurality of KPIs comprises at least one of voice dropped call rates, data dropped call rates, successful call establishment rate, successful session establishment rate, throughput, voice traffic, data traffic, neighbor traffic, uplink received signal strength indication (RSSI) levels, downlink RSSI levels, radio resource control (RRC) attempts, transmit power, number of voice users, number of data users, or parameter settings.

17. A computer storage system comprising a non-transitory storage device, said computer storage system having stored thereon executable program instructions that direct a computer system to at least:
   access historical performance data and baseline data for a cell in a telecommunications network, the historical performance data comprising a plurality of key performance indicators (KPIs);
   electronically output a graphical user interface for presentation to a user, the graphical user interface comprising functionality for the user to select one or more of the KPIs;
   receive, from the graphical user interface, a user selection of a first KPI of the plurality of KPIs;
   apply a machine learning model to the first KPI and a second KPI in the plurality of KPIs to identify a relationship between the first KPI and the second KPI;
   apply the machine learning model to the first KPI and a third KPI in the plurality of KPIs to identify a second relationship between the first KPI and the third KPI;
   determine that a correlation between the first KPI and the third KPI is greater than a threshold correlation value based on the identified second relationship;
   generate a first model parameter based on the identified relationship between the first KPI and the second KPI;
   generate a second model parameter based on the identified second relationship between the first KPI and the third KPI in response to the determination that the correlation between the first KPI and the third KPI is greater than the threshold correlation value;
   apply the baseline data to the first model parameter and the second model parameter;
   calculate a predicted value of the first KPI for the cell in the telecommunications network based on the application of the baseline data to the first model parameter and the second model parameter; and
   output a representation of the predicted value of the first KPI for presentation to the user.

18. The computer storage system of claim 17, wherein the predicted value of the first KPI is calculated for a first date.

19. The computer storage system of claim 18, wherein the computer storage system further has stored thereon executable program instructions that direct the computer system to at least calculate a second predicted value of the first KPI for a second date.

20. The computer storage system of claim 19, wherein the graphical user interface comprises functionality for the user to adjust a date.

21. The computer storage system of claim 20, wherein the computer storage system further has stored thereon executable program instructions that direct the computer system to at least:
   receive, from the graphical user interface, an adjustment from the first date to the second date; and
   output a representation of the second predicted value of the first KPI for presentation to the user.

* * * * *